Dec. 20, 1966  S. J. ZUCKER  3,292,971
TRUCK UNLOADING ALL-WEATHER GUARD
Filed March 17, 1965  6 Sheets-Sheet 3
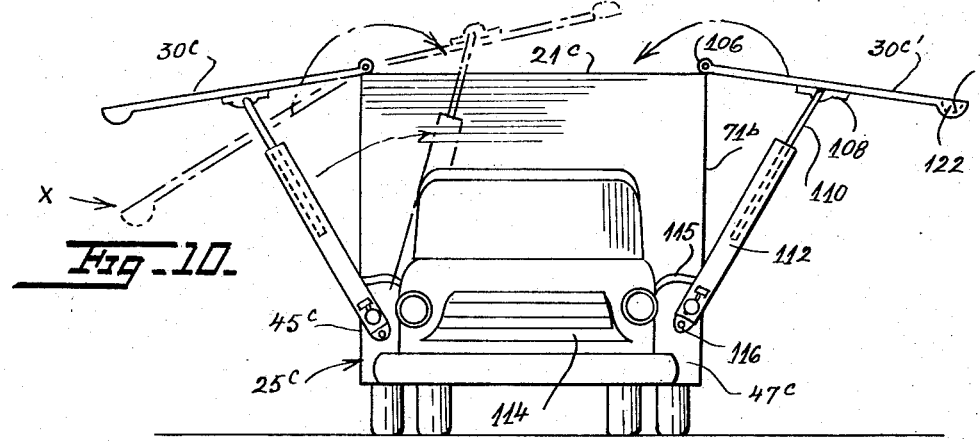
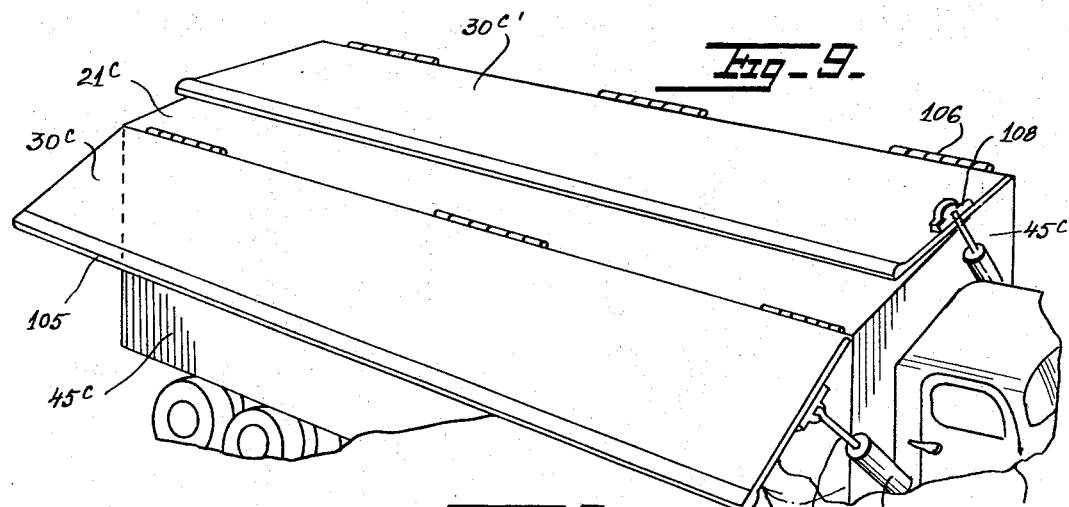
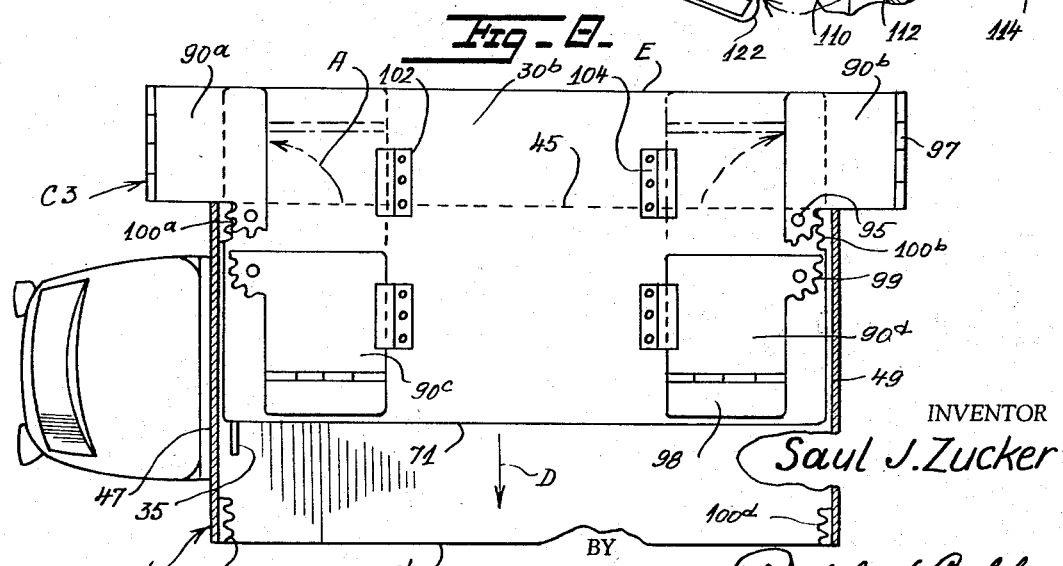
INVENTOR
Saul J. Zucker
BY
Polachek & Saulsbury
ATTORNEYS

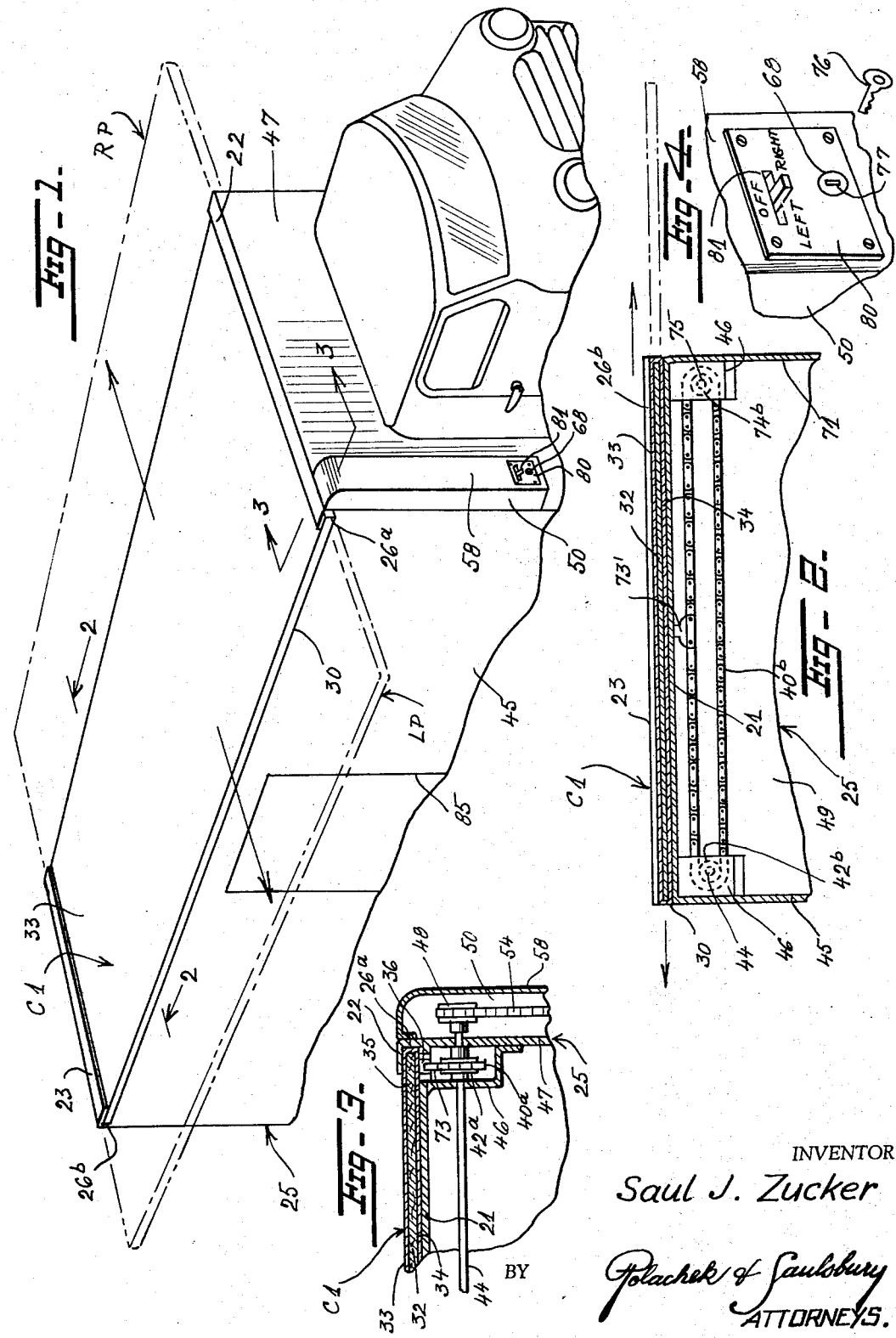

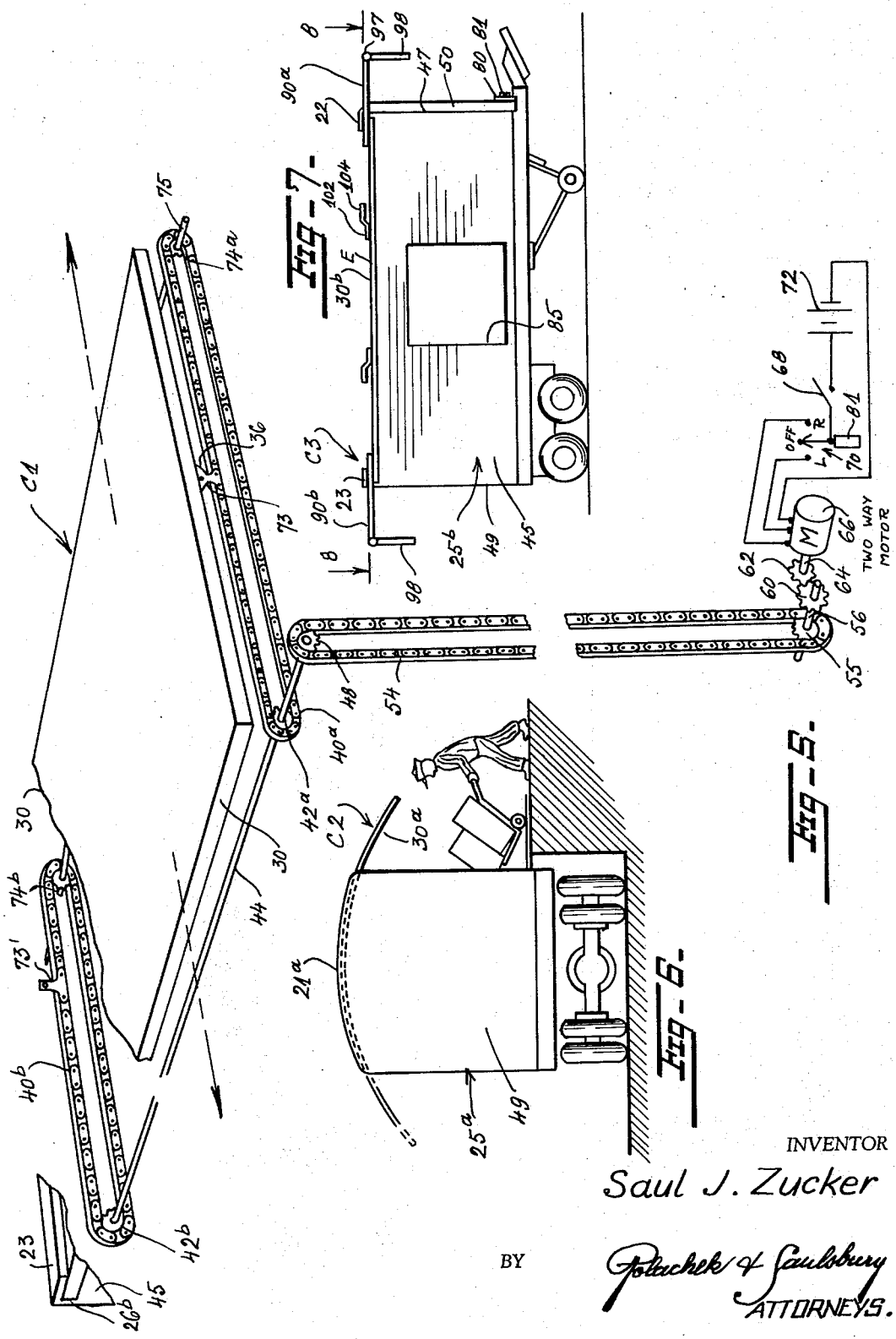

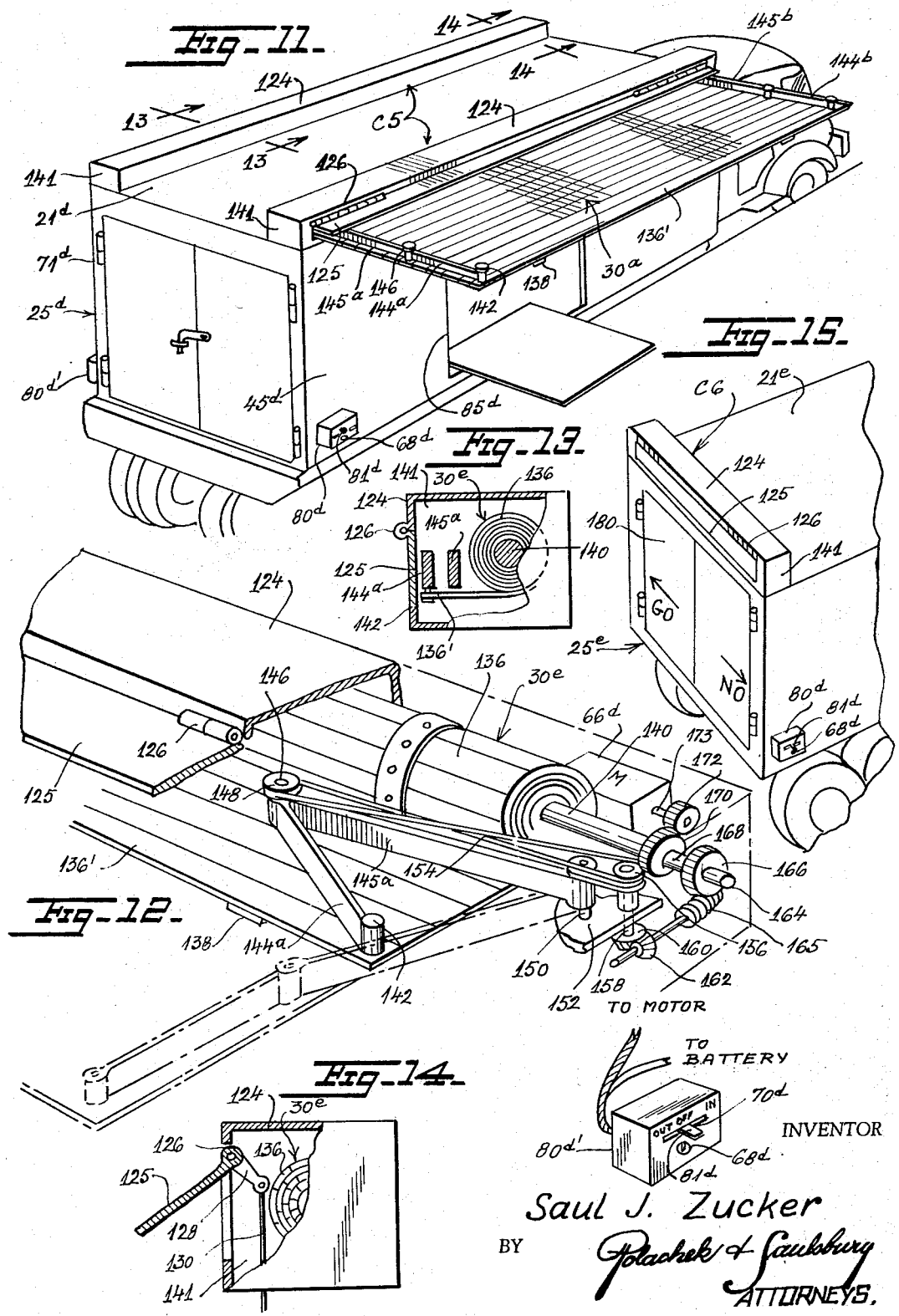

Dec. 20, 1966  S. J. ZUCKER  3,292,971
TRUCK UNLOADING ALL-WEATHER GUARD
Filed March 17, 1965  6 Sheets-Sheet 5
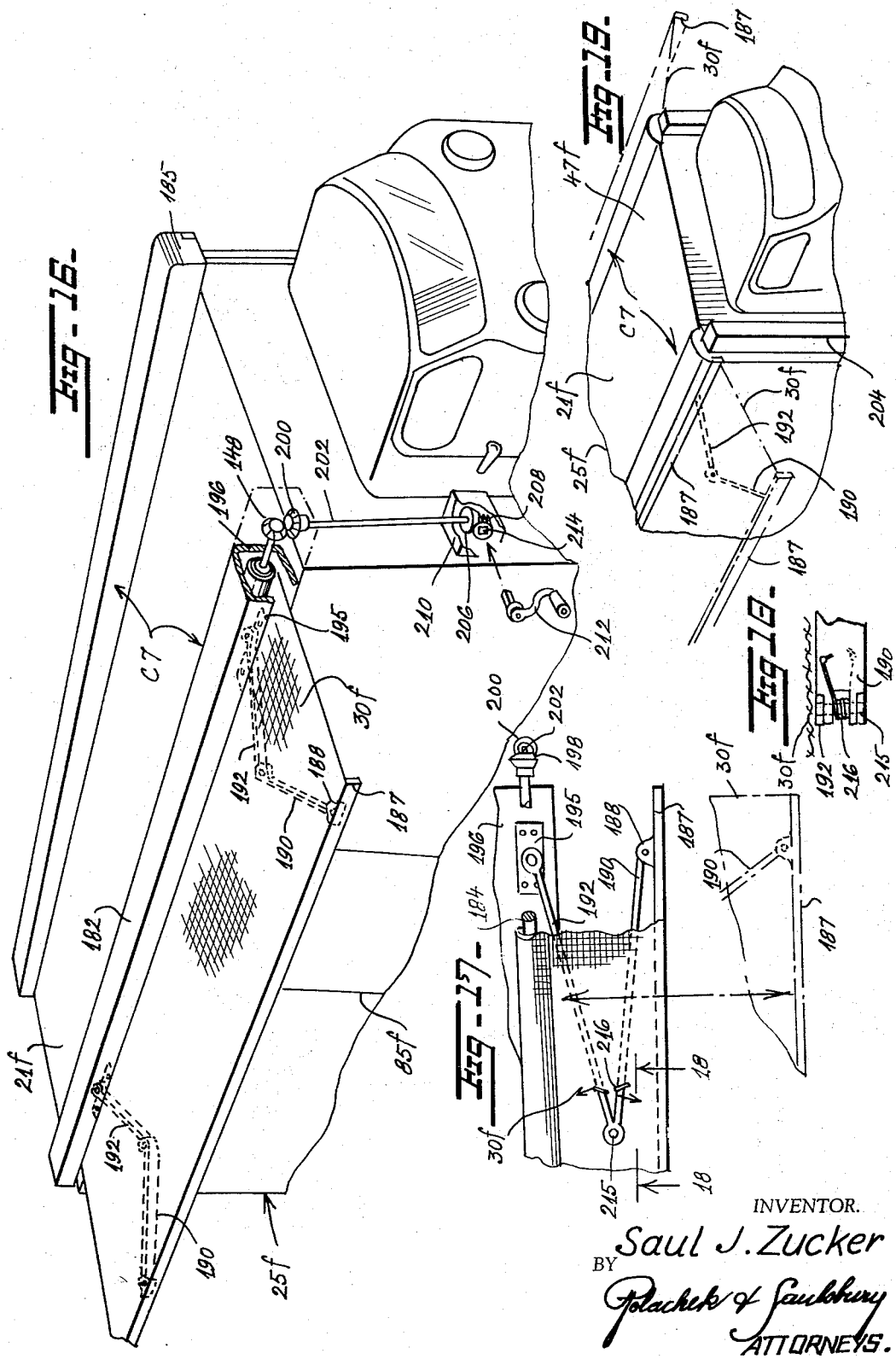
INVENTOR.
Saul J. Zucker
BY
Polachek & Saulsbury
ATTORNEYS.

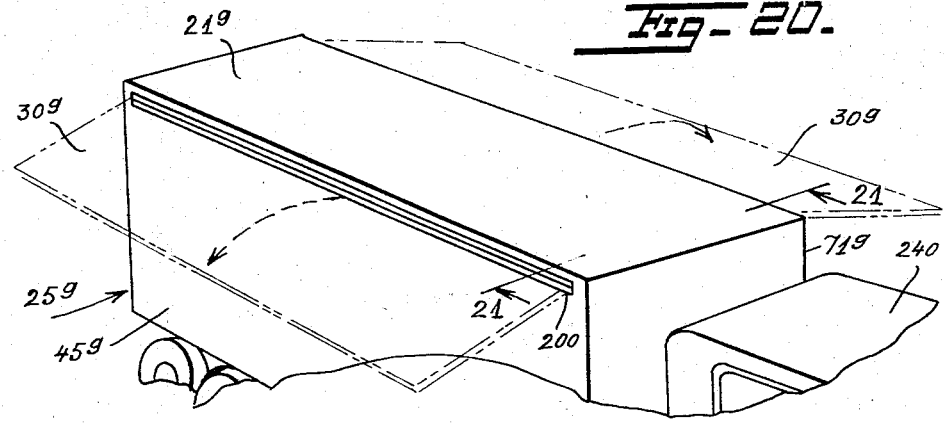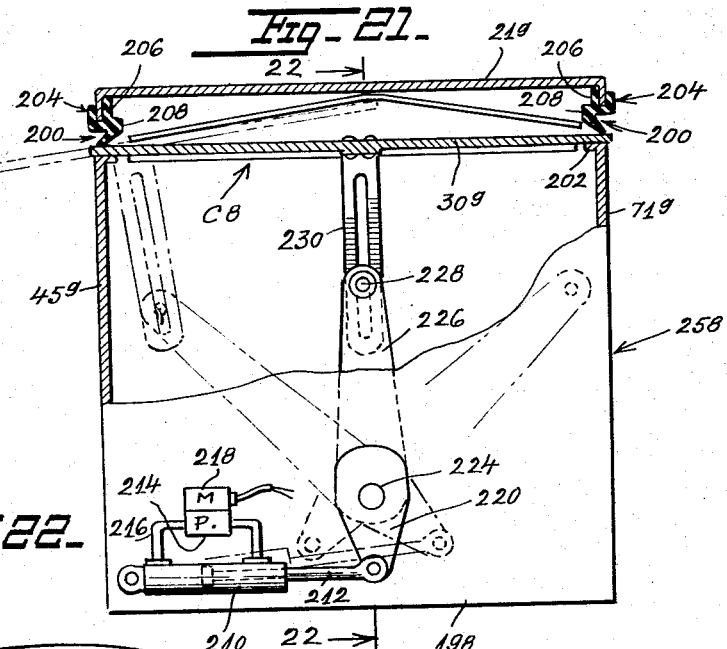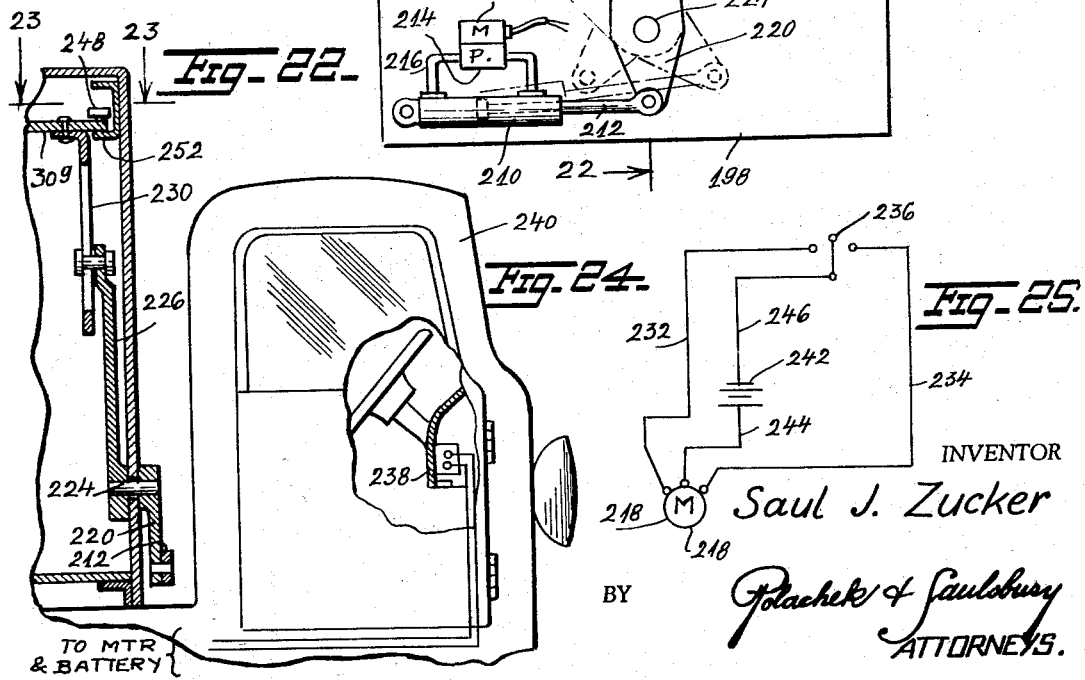

United States Patent Office 3,292,971
Patented Dec. 20, 1966

3,292,971
TRUCK UNLOADING ALL-WEATHER GUARD
Saul J. Zucker, 16790 NE. 14th Ave.,
Brooklyn, N.Y. 33162
Filed Mar. 17, 1965, Ser. No. 440,471
5 Claims. (Cl. 296—137)

This invention concerns canopy assemblies which can be installed on the roofs of trailer vans, freight cars, truck bodies, and bodies of other vehicles to serve as overhead shelters while the vehicles are being loaded and unloaded.

An object of the invention is to provide an extensible canopy which can be mounted at a side or end of the roof of a vehicle, with an associated mechanism for extending and retracting the canopy.

Another object is to provide a canopy as described, wherein the mechanism operating the canopy is manually operated or motor driven.

A further object is to provide a canopy assembly as an attachment for the roof of a vehicle, the assembly including a housing in which is a rolled up canopy, the canopy being extensible outwardly over a side or end of the vehicle.

Still another object is to provide a novel assembly of two retracted canopies removably installed on the roof of a vehicle and operatable to extending either one or both canopies laterally of the vehicle.

For further comprehension of the invention and of the advantages thereof, reference will be had to the following description and accompanying drawings, and to the appended claims in which the various novel features of the invention are more particularly set forth.

In the accompanying drawings forming a material part of this disclosure:

FIGURE 1 is a perspective view of a canopy assembly with associated operating mechanism embodying one form of the invention, shown mounted on the roof of a truck body, FIG. 2 is a sectional view taken on line 2—2 of FIG. 1, FIG. 3 is a fragmentary sectional view taken on line 3—3 of FIG. 1, FIG. 4 is an enlarged perspective view of a control panel, shown on a reduced scale in FIG. 1, FIG. 5 is an exploded perspective view of parts of the canopy and operating mechanism of FIGS. 1-4, portions being broken away, FIG. 6 is an end view of another truck body showing a modification of the invention, FIG. 7 is a side view on a reduced scale of a trailer van with another canopy assembly mounted thereon, FIG. 8 is an enlarged top plan view partially in section taken on line 8—8 of FIG. 7, FIG. 9 is a perspective view of still another canopy assembly shown mounted on a truck body, FIG. 10 is an end view of the canopy assembly and truck body of FIG. 9, FIG. 11 is a perspective view of another canopy assembly mounted on a trailer van, FIG. 12 is an enlarged fragmentary perspective view of parts of the operating mechanism for the canopy of FIG. 11, FIG. 13 and FIG. 14 are enlarged sectional views, taken on lines 13—13 and 14—14 respectively of FIG. 11, FIG. 15 is a fragmentary perspective view of a truck body, showing another canopy assembly mounted on the end of a truck body, FIG. 16 is a perspective view of still another canopy assembly mounted on the roof of a truck body, FIG. 17 is a plan view of parts of the canopy assembly of FIG. 16, illustrating the mode of operation thereof, FIG. 18 is a fragmentary sectional view taken on line 18—18 of FIG. 17, and FIG. 19 is a perspective view of part of the canopy assembly of FIG. 16, showing both canopies retracted, FIG. 20 is a perspective view of the top portion of a truck body embodying a still further modified form of the invention, the canopy assembly being shown in extended position in dot-dash lines, FIG. 21 is a sectional view taken on the line 21—21 of FIG. 20, parts being shown in elevation, FIG. 22 is a vertical sectional view taken on the line 22—22 of FIG. 21, FIG. 23 is a view taken on the line 23—23 of FIG. 22, FIG. 24 is a side elevational view of the driver's cab, parts being broken away, and FIG. 25 is a view of the wiring circuit for the canopy assembly actuating mechanism of FIG. 20.

Referring first to FIGS. 1-5, there is shown canopy assembly C1 mounted on the flat horizontal roof 21 of a truck body 25. The canopy assembly may be mounted instead on the flat roof of a trailer van, freight car or other vehicle. Two flat horizontal rails 22, 23 are mounted at opposite ends of the roof and slightly spaced therefrom to define grooves 26a, 26b therebetween. Groove 26a defined by the front rail 22 is open rearwardly of the vehicle body and the groove 26b defined by rear rail 23 is open forwardly.

Slidably disposed between the grooves is a flat laminated panel 30. This panel may have a wood core 32 enclosed between sides 33, 34 of a sheet metal enclosure. Two slots 35 are provided in the roof near its front and rear ends just below the rear edge of rail 22 and front edge of rail 23; see FIG. 3.

Brackets 36 are secured to the underside of the panel 30 at centers of its front and rear ends. These brackets extend through the respective slots 35.

Two horizontal endless chains 40a, 40b are carried at their left ends, as viewed in FIG. 5, on drive sprockets 42a, 42b mounted on drive shaft 44. Shaft 44 extends along the inner side of left wall 45 of the truck body. Opposite ends of the shaft 44 are journaled in bearing brackets 46 adjacent the front and rear end walls 47, 49 and left wall 45, at corners of vehicle body 25. The sprockets 42a, 42b are rotatably disposed between the brackets 46 and the front and rear end walls 45, 47 respectively of the truck body.

On the front end of shaft 44 is a sprocket 48 located inside of an elongated vertically disposed casing 50 mounted on the front end wall 47 of the truck body. Another endless chain 54 located in casing 50 is engaged at its upper end on sprocket 48. The bottom end of chain 54 is engaged on a sprocket 55 mounted on a short shaft 56 journaled in the front end wall 47 of the truck body and front wall 58 of casing 50. On shaft 56 is a gear 60 engaged with drive gear 62 mounted on motor drive shaft 64 and driven by motor 66. The motor is of a reversible type connected in series circuit with a single pole, key operated lockswitch 68, a single pole three position switch 70, and battery power supply 72, as shown in FIG. 5. Fingers 73, 73' on chains 40a, 40b are secured to brackets 36 on panel 30.

Right ends of the chains 40a, 40b are engaged on idler sprockets 74a, 74b mounted on idler shaft 75 located near the right side wall 71 of the truck body. This shaft is journaled in brackets 46' at the front and rear end walls 47, 49 and right wall 71, in corners of the truck body.

In operation of the canopy C1 and associated drive mechanism, the canopy will normally be disposed in a retracted position centered over the roof 21 of the truck body. The width of the canopy is substantially equal to that of the roof 21 as clearly shown in FIG. 2. Key 76 will be inserted into keyhole 77 of lockswitch 68 in control panel 80, shown in FIGS. 1 and 4, and located near the bottom of casing 50. When the key is turned, switch 68 is closed. The handle 81 of switch 70 will then be moved from its center OFF position to either its LEFT or RIGHT positions. This will actuate the motor 66 to drive the chain 54 and in turn the chains 40a, 40b so that the panel 30 will move horizontally to the left or right depending on which position of switch 70 was selected. FIG. 1 shows in dotted lines the two positions LP and RP which the panel 30 can assume. Brackets 36 will be stopped at ends of slots 35 so that the panel cannot be extended more than half way laterally outward of the truck body parallel to the roof and resting thereon.

The panel will serve as a canopy, awning or shield over side openings 85 in the sides of the truck. Workers loading or unloading the truck as well as merchandise being loaded and unloaded will be protected from sun, rain, snow, dust, etc., when the canopy is extended. After the canopy reaches the required extended position the motor can be turned off by setting switch handle 81 at the OFF position. When loading or unloading of the truck is completed, the canopy can be retracted to its centered position on roof 21 by setting switch handle to the other switch RIGHT or LEFT position. When the canopy reaches center position the switch handle 81 will be set to OFF and key 76 will be turned and removed, thus opening switch 68. The frictional engagement of the panel in the rails 22, 23 as well as the frictional engagement of the chains and sprockets will hold the canopy panel 30 effectively in place on the roof when not in extended position.

FIG. 6 shown another canopy installation C2 which is similar to canopy assembly C1, except that panel 30a is cylindrically curved to conform to the curved roof 21a of the truck body 25a. The rails and other parts of the assembly and drive mechanism will be adapted to operate with the curved panel for extending this panel laterally at each side of the truck body.

FIGS. 7 and 8 show another canopy assembly C3 mounted on a trailer van 25b. In this embodiment of the invention, the drive mechanism is the same as in canopy assembly C1 and corresponding parts are identically numbered. Mounted at the four corners of panel 30b are three smaller panels 90a–90d. Each of the panels is pivotable on panel 30b. The smaller panels pivot on pins 95 secured near opposite ends of panel 30b. Attached to each of the smaller panels by a hinge 97 is a narrow panel 98. One corner of each of the panels 90a–90d is formed with gear teeth 99. On the roof 21b of the vehicle body 25b are secured four short rack gears 100a–100d. These gears are located near the corners of the roof and face inwardly to engage the gear teeth of the panels 90a–90d respectively.

When the edge E of panel 30b is moved past side wall 45 to the position shown in FIG. 8, the gear teeth 99 of panels 90a, 90b engage the rack gears 100a, 100b respectively so that the panels 90a, 90b are automatically pivoted laterally outward horizontally as indicated by arrows A. The narrow panels 98 then hang down vertically as shown in FIG. 7 at front and rear ends of the vehicle body. When the panel is retracted to center position in direction D by operation of the motor driven mechanism, panels 90a, 90b automatically pivot horizontally in opposite directions to restore them to the dotted line positions thereof shown in FIG. 8. The narrow panels 98 assume horizontal positions as they reach the edge E of the panel 30b. Panels 90c, 90d are shown in retracted position on panel 30b. These panels will be automatically simultaneously extended like panels 90a, 90b if panel 30b is moved in direction D to extend the edge E' of panel 30b over the side 71 of the vehicle body. Stop plates 102 secured on the panel top have raised edges 104 under which panels 90a–90d engage frictionally to hold these panels in retracted position on panel 30b.

Canopy assembly C4 shown in FIGS. 9 and 10 includes two panels 30c, 30c' secured to opposite lateral edges of roof 21c by hinges 106. Secured to the front end of each panel is a bearing bracket 108 which pivotally engages the upper end of a piston shaft 110. The lower end of the piston shaft is slidably disposed in a hydraulic cylinder 112. The cylinders 112 are connected by hydraulic cables 115 to an air compressor (not shown) operated by the engine of the truck 114. The lower ends of the cylinders 112 are pivotally attached by bolts 116 to the front wall 47c of the truck body 25c. Manually operable valves 118 near lower ends of the cylinders serve for releasing air from the cylinders to cause the piston shafts to retract into the cylinders. Each of the panels has a trough 120 at its outer edge for catching rainwater. Ends of the troughs are closed by walls 122. Both panels can be extended to the positions shown in solid lines in FIGS. 9 and 10 beyond side walls 45c, 71c. The panels can be lowered by releasing air from the cylinders through valves 118 to drain water out of the troughs as indicated by the lowered dotted line position of panel 30c in FIG. 10. The panels can be closed by first closing the valves 118 and then operating the engine to drive air into the cylinders. As the panels are raised, cylinders 112 and piston shafts 110 will assume axially vertical positions, whereupon the engine can be stopped, valves 118 can be opened and the cylinders can be pushed manually laterally while the panels descend to the closed position shown by dotted lines for panel 30c in FIG. 10, and by solid lines for panel 30c' in FIG. 9. To extend the panels, the valves 118 will be closed and the engine will be operated to drive air into the cylinders for extending the piston shafts. After the cylinders and shafts are vertical the cylinders can be pushed manually laterally outward of walls 45c, 71c while release of air from the cylinders through valves 118 is controlled. At the desired spread out position of the panels the valves 118 will be closed, so that the panels are held by air pressure in the elevated position shown in FIG. 10.

In FIGS. 11–14 is shown a pair of canopy assemblies C5 mounted at lateral edges of roof 21d of the trailer van 25d. Each of these canopy assemblies includes an elongated rectangular housing 124 with a side door 125 pivoting outwardly on hinges 126. Attached to the door is a lever 128 to which a depending rod 130 is connected as shown in FIG. 14. When the rod is raised manually, the door 125 opens outwardly.

Inside the housing is a rolled up panel 30e made of a multiplicity of slats 136 secured to flexible tapes 138. The slatted panel is rolled up on a shaft 140 journaled in opposite end walls 141 of housing 124. Attached to ends of the outermost slat 136' at the outer end of the panel are pins 142. Pivotally engaged on pins 142 are links 114a, 144b. The links are pivotally connected to one end of supporting lines 145a, 145b by shafts 146. The other ends of links 145a, 145b are pivotally supported on shafts 150 secured to a bracket 152 in the housing.

On one of shafts 146 is a pulley 148. An endless belt 154 is engaged on this pulley and on a drive pulley 156 carried by a drive shaft 158. Shaft 158 is journaled in bracket 152. Under this bracket on shaft 158 is a bevel gear 160 meshed with another bevel gear 162 mounted on a shaft 164 journaled in opposite sides of the housing 124. On shaft 164 is a worm 165 engaged by a worm gear 166 on shaft 140. Shaft 140 also carries a gear 170 engaged by drive gear 172 on shaft 173 of reversible motor 66d. This motor is connected in circuit with a key operated lockswitch 68d and a three position selector switch 70d having an operating handle 81d, in a manner similar to that described in connection with FIG. 5.

In operation of canoppy assemblies C5, the controls on control box 80d or 80d' at opposite sides of the van 25d will be operated depending on which panel is to be extended. When handle 81d is set to the OUT position, the folded links 144a, 145a and 144b, 145b of the selected canopy assembly will expand as the motor drives the belt 154 through the gear train. Shaft 140 will rotate to unroll panel 30e. The expanded links will assume the position shown in FIG. 11 fully extending the panel 30e outwardly over opening 85d in side 45d or 71d of the trailer van. On reversing the direction of the motor by setting handle 81d to the IN position, the motor 66d will turn shaft 140 to roll up panel 30e which will be fully retracted into the housing. The door 125 will be closed when the slatted panel is fully retracted.

FIG. 15 shows a canopy assembly C6 which is identical to canopy assembly C5 except that the housing 124 is mounted at the rear end of roof 21e so that the slatted panel can extend outwardly over rear doors 180 of the vehicle body 25e. Other parts corresponding to those of assembly C6 are identically numbered.

FIGS. 16–19 shows two canopy assemblies C7 mounted at opposite lateral edges of roof 21f of vehicle body 25f. Each of the canopy assemblies includes a hood 182 in which is an axially extending shaft 184 journaled in end walls 185. A flexible, fabric panel 30 is rolled up on shaft 184. A bar 187 is secured to the outer free end of the panel. Secured to opposite ends of this bar are brackets 188. Links 192 are pivotally joined at one end thereof to links 190. The other ends of links 192 are pivotally secured to brackets 195 attached to the rear wall 196 of the hood. On one end of shaft 184 is a bevel gear 198 meshed with a gear 200 secured to the upper end of a vertical shaft 202. The shaft is journaled for rotation is a housing 204 secured to the front wall 47f of the vehicle body. A bevel gear 206 on the bottom end of shaft 202 is meshed with a gear 208 in crank box 210. A manually operable crank 212 engages in recess 214 in gear 208. When the crank turns gear 208 in one direction, the shaft 184 is turned in one direction, clockwise as viewed in FIG. 16, and the flexible panel unrolls. This occurs because links 190 and 192 are joined together by a pin 215 on which are coiled springs 216; see FIGS. 17 and 18. The springs are biased to open or separate the links to tend to align them with each other.

When the crank is turned in the other direction, shaft 184 turns in reverse direction, counterclockwise as viewed in FIG. 16 and the links contract while the panel 30f is rolled up on shaft 184.

The operator of the vehicle can select either one or both of the canopy assemblies for extension of their flexible panels to serve as shields, shades or canopies over the lateral openings 85f in the sides of the vehicle body.

In all forms of the invention described there is provided a canopy assembly in which is a panel which can be selectively extended or retracted beyond the sides or end of a vehicle body to serve as a temporary sun or rain shield. The assembly is manually operated, or automatically operated by electrical controls.

Referring now to the modified form of the invention shown in FIGS. 20 to 23, inclusive, herein the canopy assembly C8 is swingably mounted under the roof 21g of the rectangular-shaped truck body 25g. The truck has side walls 45g and 71g, floor 198 and roof 21g. The side walls 45g and 71g are formed with opposed elongated slots 200 extending substantially the length of the truck body at the top. The bottom edge walls of the slots 200 are inturned forming flanges 202. Rubber squeegees 204 with U-shaped bodies 206 are mounted on the top edge walls of the slots, the bodies 206 having flexible offset lips 208 closing the slots.

The canopy assembly C8 comprises a flat panel 30g of substantially the same dimensions as the roof 21g but adapted to be swung horizontally through the slots 200 so as to overhang the adjacent areas outwardly of either the wall 45g or 71g as shown in dot-dash lines in FIG. 20.

The mechanism for swinging the panel 30g includes a cylinder 210 pivotally supported on the floor 198 of the truck and horizontally disposed thereon. A piston 212 reciprocates in the cylinder and is moved by compressed air delivered by a pump 214 in an air supply pipe 216 and actuated by a motor 218. The outer end of the piston 212 is pivotally connected to a crank arm 220 which is pivotally connected by a pivot pin 224 to a lever 226 which is connected by a pin 228 to one end of a slotted crank lever 230, the other end of the lever 230 being riveted to the panel 30f at its center. The motor is electrically connected by conductors 232 and 234 to a two-way switch 236 on the dashboard 238 in the driver's cab 240. A battery 242 is connected to the motor 218 by a conductor 244 and to the switch 236 by a conductor 246.

In operation, when the switch 236 is closed the motor 218 actuates the pump 214 which in turn moves the piston 212 swinging the crank arm 220 and levers 226 and 230 thereby swinging the panel 30g out through the respective slot 200 against the action of squeegee 204 to the outside of the truck in operative position. The panel 30g is guided and controlled in its movement by rollers 248 mounted on the end edges 250 thereof which roll in a channel shaped trackway 252 secured to the end walls of the truck body, opening inwardly thereof.

While I have illustrated and described the preferred embodiments of my invention, it is to be understood that I do not limit myself to the precise constructions herein disclosed and that various changes and modifications may be made within the scope of the invention as defined in the appended claims.

Having thus described the invention, what I claim as new, and desire to secure by United States Letters Patent is:

1. A canopy assembly for a vehicle body having a horizontal roof and adjoining vertical side and end walls, comprising a pair of rails at opposite ends of said roof defining a pair of grooves extending transversely of said body, a rectangular panel slidably mounted on said roof with opposite ends of the panel slidably engaged under said rails in said grooves, said roof having slots formed therein under said rails and communicating with the grooves, and drive means in said body extending through said slots and engaged with ends of the panel for moving the same horizontally to extend a lateral portion of the panel outwardly of either side of said body, and to retract the panel on the roof.

2. A canopy assembly for a vehicle body having a horizontal roof and adjoining vertical side and end walls, comprising a pair of rails at opposite ends of said roof defining a pair of grooves extending transversely of said body, a rectangular panel slidably mounted on said roof with opposite ends of the panel slidably engaged under said rails in said grooves, said roof having slots formed therein under said rails and communicating with the grooves, a pair of endless chains mounted on sprockets inside said body just under said slots, said chains having fingers extending upwardly through said slots and engages with ends of the panel at midpoints thereof, and motor means operatively connected to and driving the chains to advance the panel horizontally for extending a lateral portion thereof outwardly of either side of said vehicle body, said motor means including reversing means for retracting the panel to a centered position on the roof.

3. A canopy assembly for a vehicle body having a horizontal roof and adjoining vertical side and end walls, comprising a pair of rails at opposite ends of said roof defining a pair of grooves extending transversely of said body, a rectangular panel slidably mounted on said roof with opposite ends of the panel slidably engaged under said rails in said grooves, said roof having slots formed therein under said rails and communicating with the grooves, a pair of endless chains mounted on sprockets inside said body just under said slots, said chains having fingers extending upwardly through said slots and engaged with ends of the panel at midpoints thereof, and motor means operatively connected to and driving the chains to advance the panel horizontally for extending a lateral portion thereof outwardly of either side of said vehicle body, said motor means including reversing means for retracting the panel to a centered position on the roof, said roof being cylindrically curved, and said panel being cylindrically curved to conform to the curvature of the roof.

4. A canopy assembly for a vehicle body having a horizontal roof and adjoining vertical side and end walls, comprising a pair of rails at opposite ends of said roof defining a pair of grooves extending transversely of said body, a rectangular panel slidably mounted on said roof with opposite ends of the panel slidably engaged under said rails in said grooves, said roof having slots formed therein under said rails and communicating with the grooves, and drive means in said body extending through said slots and engaged with ends of the panel for moving the same horizontally to extend a lateral portion of the panel outwardly of either side of said body, and to retract the panel on the roof, small panels pivotally mounted on the rectangular panel near corners thereof, each of the small panels having a narrow panel hinged at one edge thereof, each of the small panels having gear means at one corner thereof, and other gear means of the small panels respectively only while the first named panel is being moved laterally, whereby two of the small panels at a time are turned horizontally to extend outwardly of the end walls of the vehicle body when the first panel is extended laterally, so that the narrow panels on said two small panels hang down at the ends of the vehicle body, and whereby the two outwardly turned small panels are turned inwardly over the first panel when the first panel is being retracted on the roof of the vehicle body, while the narrow panels on said two small panels are drawn up to horizontal position on the first panel.

5. A canopy assembly for a vehicle body having a horizontal roof and adjoining vertical side and end walls, comprising a pair of rails at opposite ends of said roof defining a pair of grooves extending transversely of said body, a rectangular panel slidably mounted on said roof with opposite ends of the panel slidably engaged under said rails in said grooves, said roof having slots formed therein under said rails and communicating with the grooves, a pair of endless chains mounted on sprockets inside said body just under said slots, said chains having fingers extending upwardly through said slots and engaged with ends of the panel at midpoints thereof, and motor means operatively connected to and driving the chains to advance the panel horizontally for extending a lateral portion thereof outwardly of either side of said vehicle body, said motor means including reversing means for retracting the panel to a centered position on the roof, small panels pivotally mounted on the rectangular panel near corners thereof, each of the small panels having a narrow panel hinged at one edge thereof, each of the small panels having gear means at one corner thereof, and other gear means mounted at corners of the roof engaged with the gear means of the small panels respectively only while the first named panel is being moved laterally, whereby two of the small panels at a time are turned horizontally to extend outwardly of the end walls of the vehicle body when the first panel is extended laterally, so that the narrow panels on said two small panels hang down at the ends of the vehicle body, and whereby the two outwardly turned small panels are turned inwardly over the first panel when the first panel is being retracted on the roof of the vehicle body, while the narrow panels on said two small panels are drawn up to horizontal position on the first panel.

References Cited by the Examiner

UNITED STATES PATENTS

| | | | |
|---|---|---|---|
| 1,845,577 | 2/1932 | Berliawsky | 296—99 X |
| 2,001,224 | 5/1935 | Tames | 296—99 |
| 2,976,078 | 3/1961 | Maidl | 296—99 X |
| 3,067,813 | 12/1962 | Henatsch | 160—193 X |

BENJAMIN HERSH, *Primary Examiner.*

C. C. PARSONS, *Assistant Examiner.*

UNITED STATES PATENT OFFICE
CERTIFICATE OF CORRECTION

Patent No. 3,292,971                        December 20, 1966

Saul J. Zucker

It is certified that error appears in the above identified patent and that said Letters Patent are hereby corrected as shown below:

In the heading to the printed specification, line 4, "Brooklyn, N. Y." should read -- North Miami Beach, Fla. --.

Signed and sealed this 9th day of December 1969.

(SEAL)
Attest:

Edward M. Fletcher, Jr.                   WILLIAM E. SCHUYLER, JR.
Attesting Officer                             Commissioner of Patents